Oct. 21, 1930.  E. STIEFEL  1,778,988
PLANT FOR PRODUCING COMPRESSED AIR
Filed Sept. 29, 1928
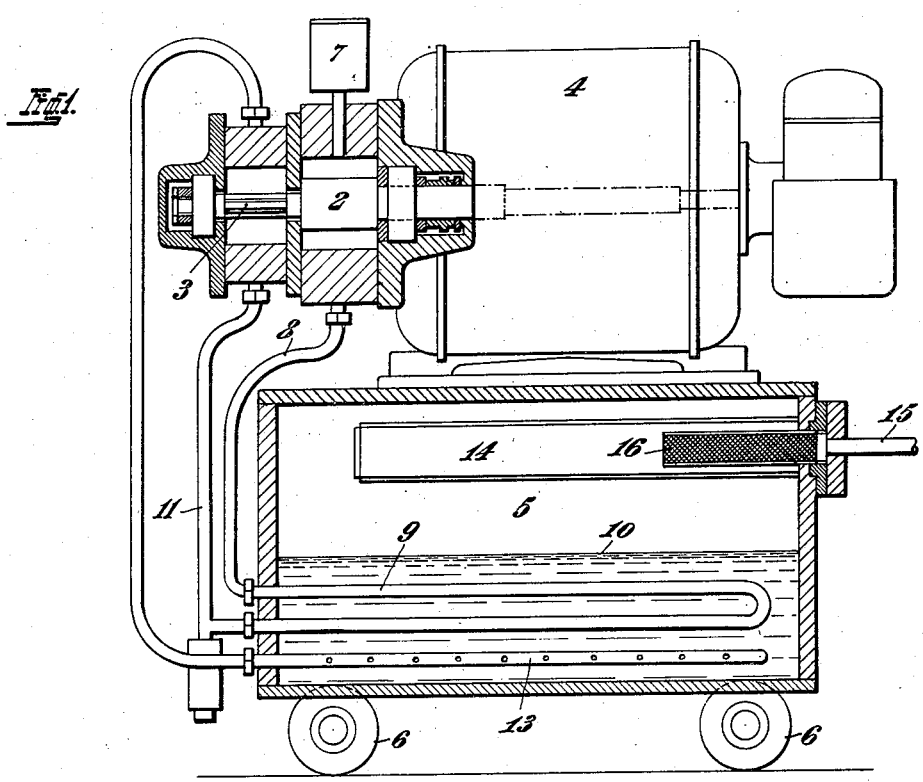
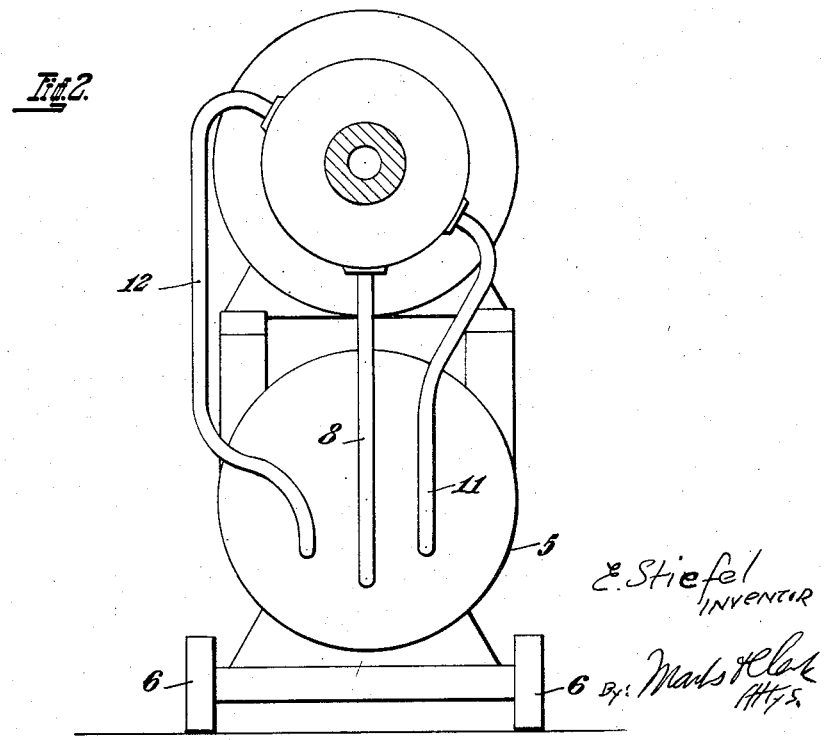

Patented Oct. 21, 1930

1,778,988

UNITED STATES PATENT OFFICE

ERNST STIEFEL, OF BAUMA, SWITZERLAND

PLANT FOR PRODUCING COMPRESSED AIR

Application filed September 29, 1928, Serial No. 309,268, and in Switzerland October 21, 1927.

This invention relates to plants for producing compressed air comprising a multistage or multi-stage rotary air compressor. It consists in arranging the rotary compressor with its driving machine on a container or tank whereof the inside serves for holding a cooling medium, e. g. water, and cleaning devices for the delivered compressed air. Preferably, the compressed air passing from one stage to another of the rotary compressor is cooled by means of cooling tubes in the tank, and the compressed air delivered from the last stage is passed, for the purpose of purifying and cooling it, through the cooling medium in the tank. Further, according to another feature of the invention, the delivered air may be sent through a filter in the upper part of the tank after flowing through the cooling medium, but before arrival at its place of use.

One embodiment of the invention is diagrammatically illustrated by way of example in the accompanying drawing, wherein:—

Figure 1 is a longitudinal section, and

Figure 2 is a transverse section taken through one form of compressed-air plant according to the invention.

Like reference characters designate like parts in both views.

Referring to the drawing, a two-stage rotary air-compressor 1 having a first stage 2 and a second stage 3 is driven by any convenient driving machine, for example an electric motor 4. The compressor is mounted on a container or tank 5 which may rest on rollers 6. Atmospheric air is introduced through a suction filter 7 into the first stage and leaves the same through a pipe 8, which leads through a cooling coil 9 in the tank 5 filled with a cooling medium, such as water, up to the height indicated at 10. The air cooled in the coil 9 passes through the pipe 11 into the second stage of the compressor and leaves the latter at the pressure generated therein through the pipe 12. This pipe 12 is connected with a pipe 13 provided in the lower part of the tank. This pipe 13 is perforated so that the compressed air when escaping upwards through the perforations, must pass through the cooling medium. The compressed air cooled and purified in this manner passes into an outlet tube 14 at or near the top of the tank and passes thence through a delivery pipe 15 to its place of use. In order that the compressed air may be cleaned still more, in the embodiment illustrated there is arranged in the upper part of the tank a filter 16 filled with a suitable filtering salt.

Figure 2 shows how the pipes 8, 11 and 12 are arranged between the compressor and tank of the described unitary structure. As the interior of the tank 5 is subjected to the pressure produced by the pump 1, the tank must be made sufficiently strong to withstand it; the cylindrical form, as shown in Figure 2, is therefore particularly suitable for it.

Various modifications may be made in the details of construction described above without departing from the invention.

I claim:—

1. In a plant for producing compressed air, the combination with a container adapted to hold a cooling medium, a two-stage air compressor and driving machine therefor mounted on the container, a cooling device in the container, a purifying device in the container, said cooling device and purifying device being submerged in the cooling medium, and pipe connections between the compressor, cooling device and purifying device for conducting air through the purifying device.

2. In a plant for producing compressed air, the combination of a container adapted to hold a cooling medium, a multi-stage air compressor and a motor for driving the same mounted thereon, a cooling device in the cooling medium and connected between two stages of the compressor, and means for passing the air delivered from the last stage of the compressor through the cooling medium.

3. In a plant for producing compressed air, the combination of a container adapted to hold a cooling medium in the lower part thereof, a two-stage air compressor and a motor for driving the same mounted on the container, a filter in the upper part of the container in front of the outlet in the latter, a cooling device in the lower part of the container, a purifying device in the cooling medium and in connection with the filter, and pipe connections between said compressor, cooling device and purifying device for passing air through the latter to the filter.

4. In a plant for compressing air, a unitary structure comprising the combination of a horizontal cylindrical tank having an outlet in the upper part thereof, a two-stage rotary air compressor and motor for driving the same mounted on the tank, the lower part of the tank being adapted to hold a cooling medium, a filter for air in the upper part of the tank in front of said outlet above the cooling medium, a coiled pipe in the cooling medium and connected between the two stages of the compressor, and a perforated pipe in the cooling medium and connected to the delivery side of the second stage of the compressor.

In testimony whereof I affix my signature.

ERNST STIEFEL.